United States Patent [19]

Mendez et al.

[11] Patent Number: 5,501,141
[45] Date of Patent: Mar. 26, 1996

[54] TORTILLA WARMING APPARATUS

[76] Inventors: Estuardo Mendez, 1345 Cabrillo Park Dr. #E-6, Santa Ana, Calif. 92701; Jorge Uriarte, 13 Cornwallis, Irvine, Calif. 92720

[21] Appl. No.: 265,067

[22] Filed: Jun. 28, 1994

[51] Int. Cl.⁶ .............. A47J 43/00; A23P 1/00; B65D 1/36
[52] U.S. Cl. .............. 99/426; 99/432; 99/644; 99/DIG. 15; 126/373; 220/4.22; 220/4.23; 220/4.24
[58] Field of Search .............. 99/422, 424, 425, 99/426, 432, 446, 448, 375, 397, 400; 126/390, 373; 426/523, 114; 220/4.21, 4.22, 4.23, 4.24, 4.25, 912

[56] References Cited

U.S. PATENT DOCUMENTS

| | | | |
|---|---|---|---|
| 63,753 | 4/1867 | Russell | 99/400 |
| 96,973 | 11/1869 | Saxton | 99/400 |
| 111,516 | 2/1871 | Colborne et al. | 99/400 |
| 268,736 | 12/1882 | Shaw | 99/400 |
| 749,592 | 1/1904 | Treen | 220/4.22 |
| 951,065 | 3/1910 | Ferguson | 99/400 |
| 1,264,475 | 4/1918 | Baker | 220/4.22 |
| 1,568,798 | 1/1926 | Caver | 220/4.21 |
| 3,007,595 | 11/1961 | Remley | 220/4.22 |
| 3,257,023 | 6/1966 | Braverman | 220/4.24 |
| 4,013,869 | 3/1977 | Orts | 219/401 |
| 4,176,593 | 12/1979 | Terzian | 99/422 |
| 4,360,118 | 11/1982 | Stern | 220/4.24 |
| 4,782,745 | 11/1988 | George, Jr. | 99/483 |
| 4,803,921 | 2/1989 | Nuss | 99/483 |
| 5,273,174 | 12/1993 | Fisher | 220/4.21 |

FOREIGN PATENT DOCUMENTS 923996  4/1963  United Kingdom .............. 220/4.22

*Primary Examiner*—Timothy F. Simone
*Attorney, Agent, or Firm*—Gene Scott

[57] ABSTRACT

An apparatus for warming one or more tortillas or other flat foods is disclosed. A round top pan and a round bottom pan each have a flat, circular base portion defined by an interior and an exterior flat surface. The base portions are surrounded by an integral curved rim portion that extends to one side of the base portion and terminates in an annular symmetrical lip. The base and rim portions, together, define a heating space therebetween, and the pans are positionable with lips in mutual contact in a closed orientation. The pans are hinged together so that the top pan is rotatable into an open orientation about a hinge. Each pan includes a handle portion that, when the pans are brought into the closed position, together form a handle structure suitable for gripping. A rotatable grip portion is mounted on a rod that is fixed to the bottom pan in radial orientation so that with the pans in the closed orientation, the rotatable grip portion facilitates rotation of the pans for inverting the relative positions of the pans. A plurality of bosses extend from the interior surface of the top pan for holding the tortillas in place during carrying of the device and inversion of the pans.

11 Claims, 4 Drawing Sheets

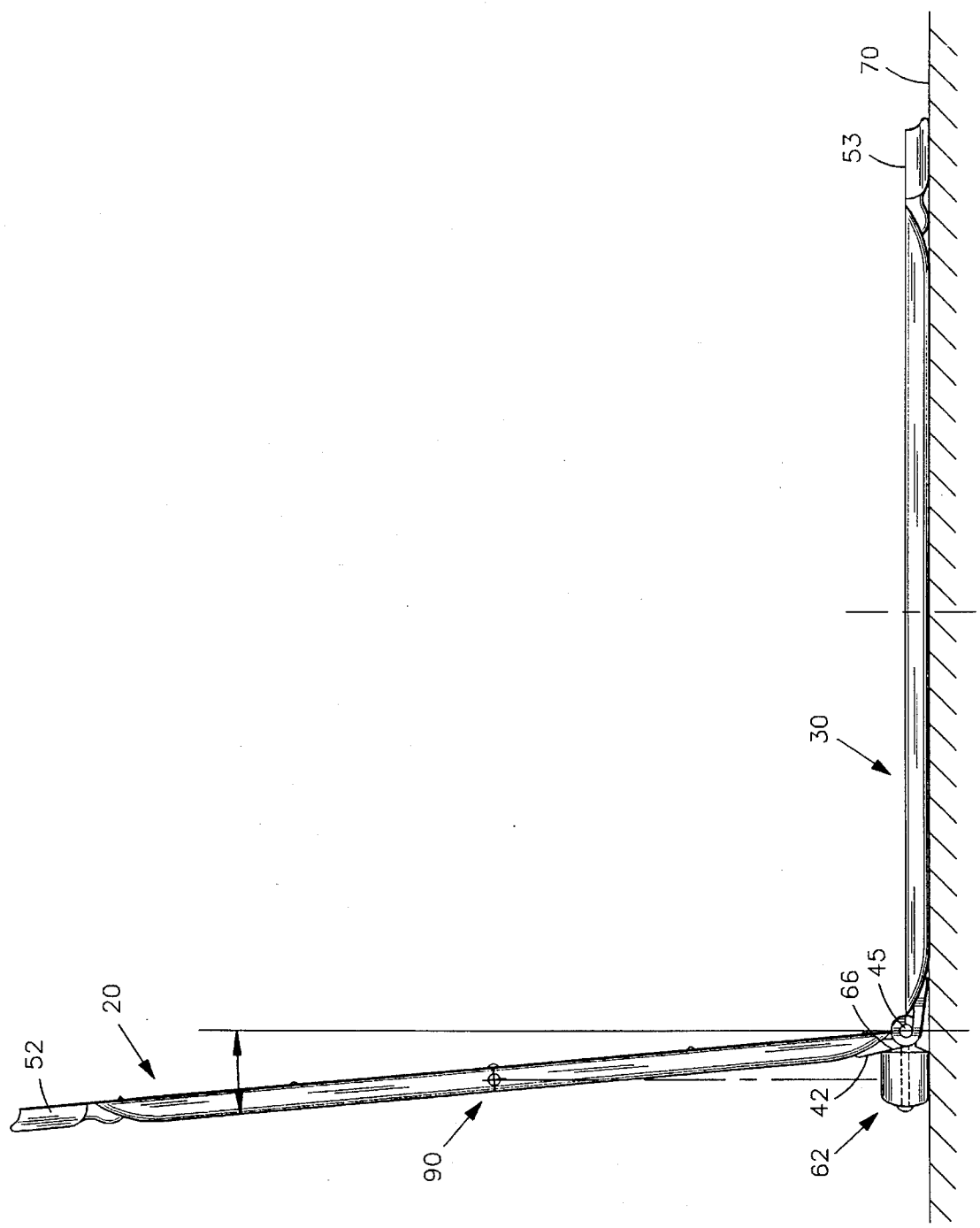

TORTILLA WARMING APPARATUS

FIELD OF THE INVENTION

This invention relates generally to cooking pans and, more particularly, is directed towards an apparatus for warming tortillas.

BACKGROUND OF THE INVENTION

Corn or flower tortillas must be heated before eating in order to best draw-out their natural flavors. However, very little exists in the prior art to achieve proper warming of tortillas. One method used by many people is to simply place tortillas quickly over the open flame of a stove, for example. The principal drawback with this method is that the tortilla may be easily burned, and that only a few tortillas may be heated simultaneously. Tortillas tend to lose their heat content relatively quickly, so if a larger number of tortillas are being warmed in this manner, the first tortillas heated are already cold by the time the other tortillas have been heated.

Another method of heating tortillas includes placing tortillas in a frying pan, or the like. However, open frying pans tend to make tortillas too dry since they allow evaporation of the natural moisture in such tortillas during heating. Further, tortillas heated in this manner are flipped over once or twice so that they are evenly cooked by the frying pan. This requires using tongs, a fork, or some other utensil, which is often a cumbersome and time consuming process.

One prior art device, taught in George, Jr. U.S. Pat. No. 4,782,745 on Nov. 8, 1988, is an appliance specifically made to heat tortillas without resulting in moisture loss, burning, or sogginess resulting from the above and other methods of tortilla warming. Such a device, however, includes a relatively large number of elements. As a result, such a device tends to be expensive, difficult to use, and difficult to clean.

Another prior art device, taught in Terzian U.S. Pat. No. 4,176,593 on Dec. 4, 1979, is a two-part pan device that allows the user to flip an omelet or the like easily. However, such a device is not suited to warming and serving tortillas since tortillas in such a device would not remain flat during flipping over of such a device, resulting in uneven cooking of the tortillas. Further, such a device has an obtrusive handle that requires considerable space on a table, making it cumbersome to use. Still further, such a device is relatively complicated as it requires a separate heating device.

Clearly, then, there is a need for a tortilla warming device that is relatively inexpensive, is easy to clean, and easy to use. Such a needed device would seal-in moisture during heating so that the tortillas do not become dried-out. However, such a needed device would not cause tortillas to become soggy. Such a needed invention would further allow a plurality of tortillas to be heated simultaneously and evenly, and would further keep such tortillas warm for a relatively long time while in the device. Further, such a needed device could be used both to heat and serve the tortillas, eliminating the need for a separate serving dish. The present invention fulfills these needs and provides further related advantages.

SUMMARY OF THE INVENTION

The present invention is an apparatus for warming one or more tortillas. A round top pan and a round bottom pan each have a flat, circular base portion having an interior and an exterior flat surface. The base portions are surrounded by an integral curved rim portion that extends fully around the base portion and terminates in an annular symmetrical lip. The base and rim portions, together, define a heating space therebetween, and the pans are positionable with lips in mutual contact in a closed orientation. The pans are hinged together so that the top pan is rotatable into an open orientation about a hinge. Each pan includes a handle portion that, when the pans are brought into the closed position, together form a handle structure suitable for gripping. A rotatable grip portion is mounted on a rod that is fixed to the bottom pan in radial orientation so that with the pans in the closed orientation, the rotatable grip portion facilitates rotation of the pans for inverting the relative positions of the pans. A plurality of bosses extend from the interior surface of the top pan for holding the tortillas in place during carrying of the device and inversion of the pans.

The present invention is a tortilla warming device that is relatively inexpensive to manufacture, is easy to clean, and easy to use. The present device seals in moisture during heating so that the tortillas do not become dried-out. However, the present device does not cause tortillas to become soggy, either. The present invention further allows a plurality of tortillas to be heated simultaneously and evenly, and keeps such tortillas warm for a relatively long time while in the device. Further, the present device can be used both to heat and serve the tortillas, eliminating the need for a separate serving dish. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a side-elevational view of the invention illustrating the pans in the open orientation.

DETAILED DESCRIPTION OF THE PREFERRED EMBODIMENT

Figure 1:
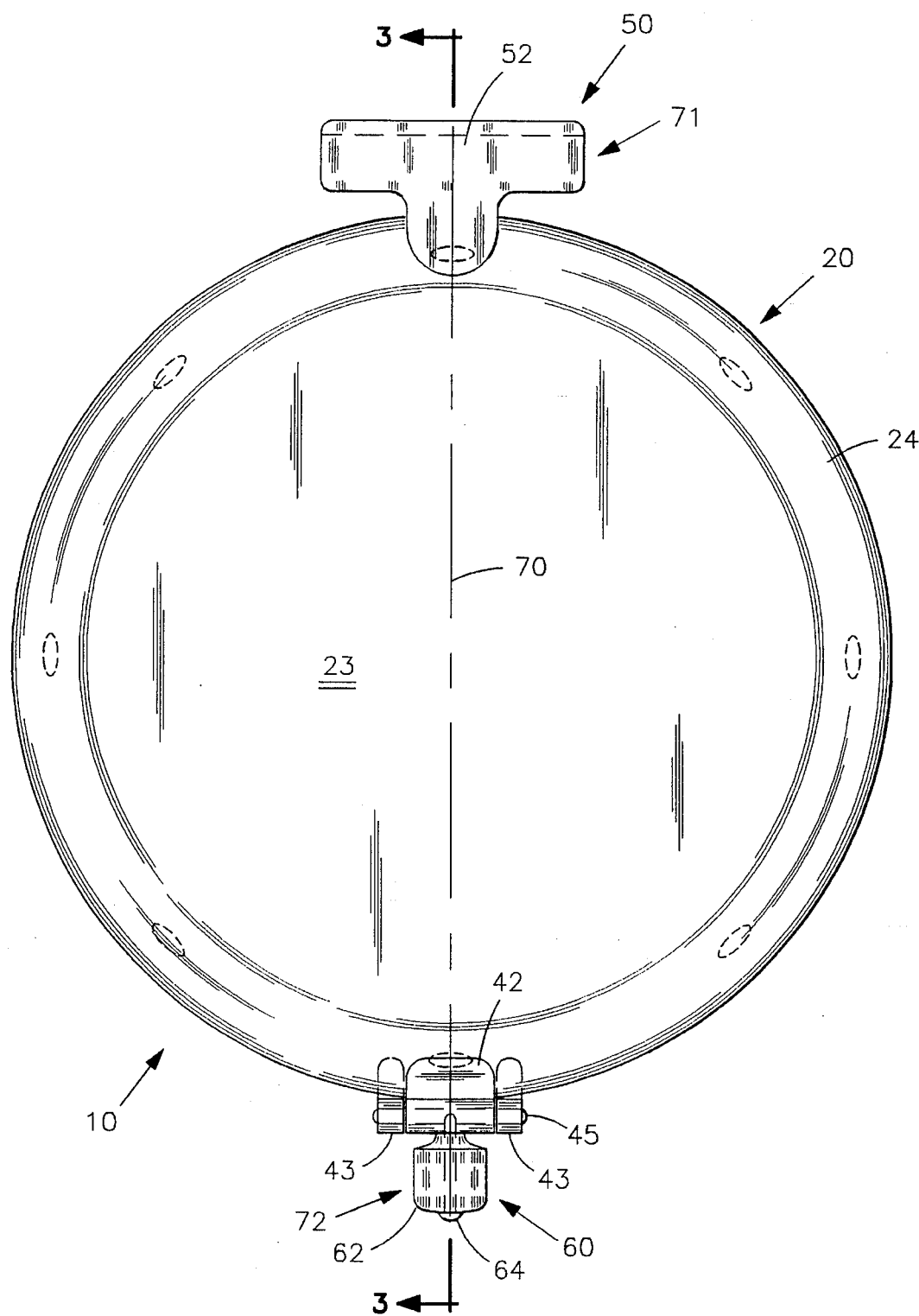
FIG. 1 is a top plan view of the invention, illustrating a top pan in mutual contact with a bottom pan, and further illustrating a handle means and a rotatable grip portion.
Figure 2:
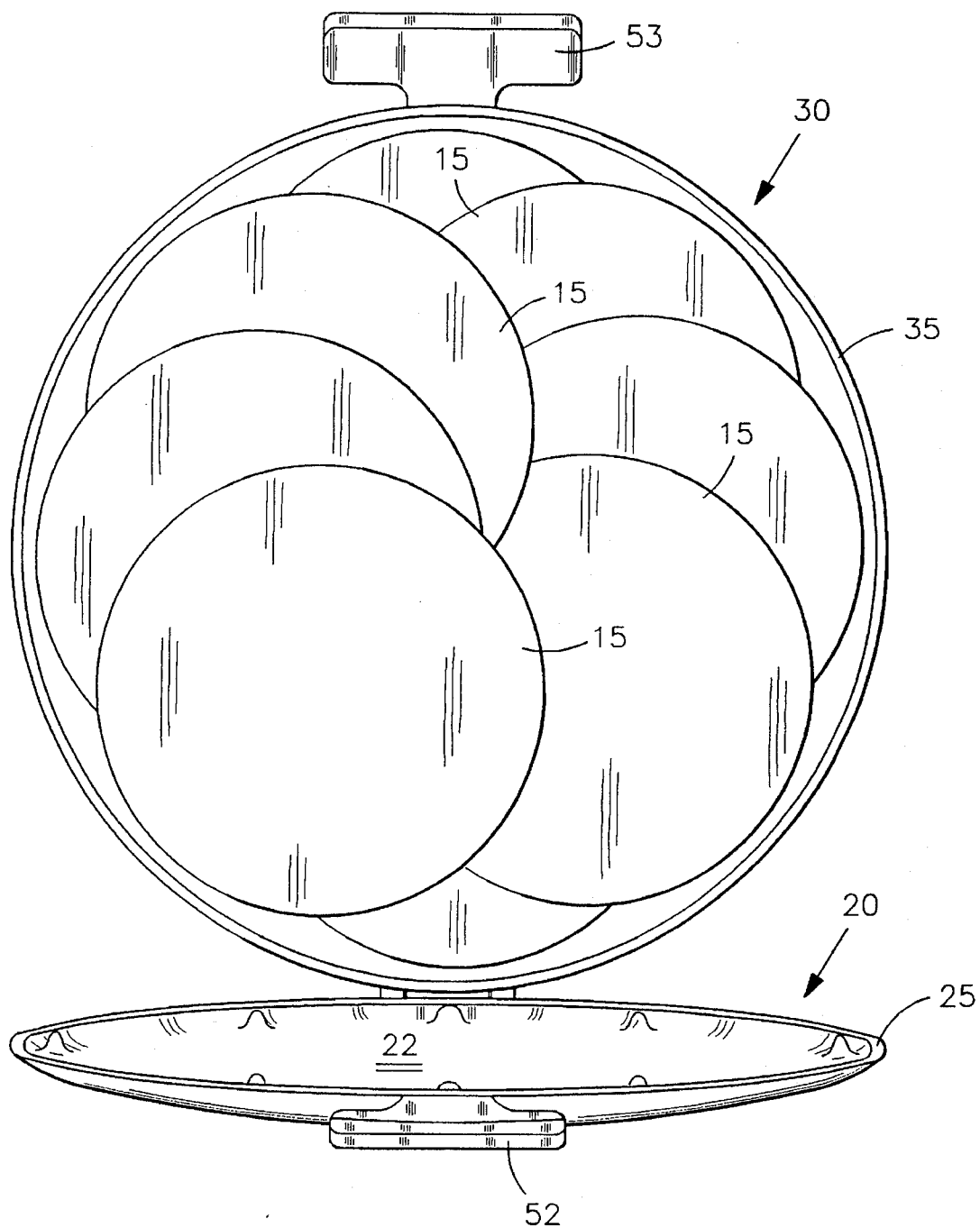
FIG. 2 is a top plan view of the invention, illustrating the top pan and the bottom pan in a mutually open orientation.
Figure 3:
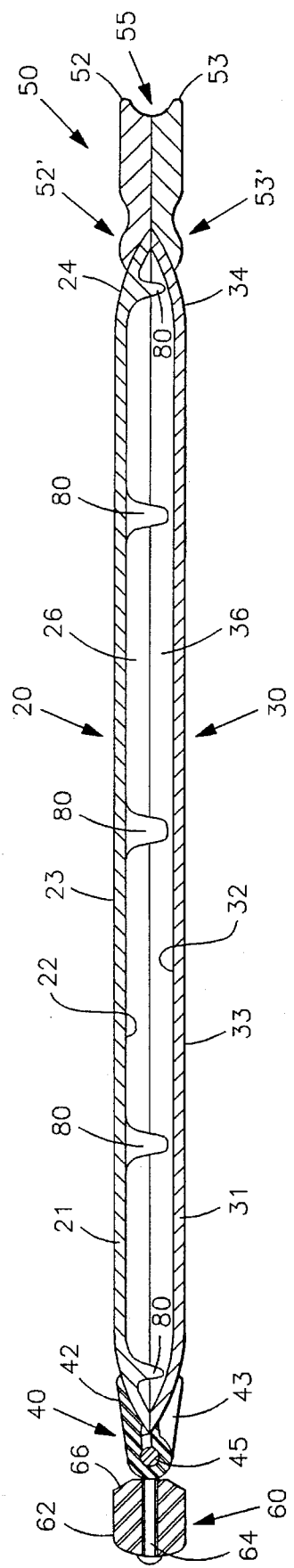
FIG. 3 is a cross-sectional view of the invention, taken generally along lines 3—3 of FIG. 1, illustrating a plurality of bosses extending downwardly from an interior surface of the top pan into a heating space between the pans.

FIGS. 1–3 show an apparatus 10 for warming a plurality of tortillas 15. FIG. 3 best shows the individual elements of the invention and their internal relationships. A top pan 20 and a bottom pan 30 each have a flat, circular base portion 21,31, respectively. Each base portion 21,31 is defined by an interior flat surface 22,32, and an exterior flat surface 23,33, respectively. The base portions 21,31 are each surrounded by an integral curved rim portion 24,34 extending to one side of the base portion 21,31 and terminating in an annular symmetrical lip 25,35, respectively. The base portions 21,31 and rim portions 24,34 together define a heating space 26,36 therebetween, respectively. The pans 20,30 are positionable with lips 25,35 in mutual contact in a closed orientation. The pans 20,30 are made from a rigid material with a high melting point, such as aluminum, steel, ceramic, glass, or the like.

A hinge means 40 has a first hinge arm 42 attached to the top pan 20 and a second hinge arm 43 attached to the bottom pan 30. As such, the top pan 20 is rotatable into a fully open orientation about a hinge pin 45 supporting the first and second hinge arms 42,43 (FIG. 4). Preferably, with the top pan 20 in the fully open orientation, the center of gravity 90 of the top pan 20 is positioned with respect to the hinge pin 45 so that the top pan 20, when left untended, tends to remain in the fully open position (FIG. 4).

The apparatus 10 further includes a first handle means 50 and a second handle means 60 that are positioned on a common diameter 70 of the pans 20,30 at opposing positions 71,72 and extending radially therefrom. Preferably, the first handle means 50 includes a first handle portion 52 and a second handle portion 53. Each of the handle portions 52,53 are attached to one of the pans 20,30 in mutually adjacent positions 52', 53', respectively, so that with the pans 20,30 in the closed orientation, the handle portions 52,53 form an integral handle structure 55 for gripping with a hand to carry and manipulate the apparatus 10 (FIG. 3).

Further, the second handle means 60 preferably includes a rotatable grip portion 62 mounted on a rod 64 that is fixed integrally with the bottom pan 30 in a radial orientation, preferably in diametric opposition to the first handle means 50. As such, with the pans 20,30 in the closed orientation, the rotatable grip portion 62 facilitates rotation of the pans 20,30 for inverting the relative positions of the pans 20,30. Preferably, with the bottom pan 30 supported on a flat surface 70, the rotatable grip portion 62 and the first handle portion 53 are in contact with the flat surface 70 for providing lateral stability to the apparatus 10. Further, the hinge means 40 allows the top pan 20 to rotate more than 90 angular degrees from the closed orientation to the fully open orientation so as to remain in the fully open orientation when placed therein. The rotatable grip portion 62 includes a peripheral surface 66 positioned for contacting the top hinge arm 42 so as to act as a prop support for holding the top pan 20 in the fully open orientation.

The top pan 20 includes a plurality of bosses 80, best seen in FIG. 3, that are positioned on and extend from the rim portion 24 into the heating spaces 26,36 for contacting, possibly penetrating, and holding the tortillas 15 in a fixed position within the apparatus 10 during both warming and inverting of the pans 20,30. Preferably the bosses extend from the top pan 20 to within 1/16 of an inch of the bottom pan 30 for securely holding the tortillas 15 in place when the pans 20,30 are in the closed orientation. Further, the heating spaces 26,36 may jointly accommodate at least twelve corn tortillas 15 when the tortillas 15 are arranged in a spiral overlapping order within the pans 20,30 (FIG. 2), or six to eight flour tortillas 15 when the tortillas 15 are arranged in a vertical stack. When used to serve tortillas 15, the apparatus 10 may be placed on a counter or table where, in the closed orientation, the food is maintained at serving temperature during a meal.

While the invention has been described with reference to a preferred embodiment, it is to be clearly understood by those skilled in the art that the invention is not limited thereto. Rather, the scope of the invention is to be interpreted only in conjunction with the appended claims. Although primarily designed as a tortilla warming apparatus 10, the instant invention is suitable for warming and cooking pancakes, latkis, kinishes, waffles, crepes, and various Indian foods such as chapati, roti, puri, papadam paranthe and mathia. The handle structure 55 may be supplemented or replaced by a removable handle having a length comparable to typical pots for the range. Such a handle (not shown) could be removable for use of the apparatus at the dining table.

What is claimed is:

1. An apparatus for warming one or more tortillas comprising:

a top and a bottom round pans formed of a rigid, high melting point material and of a diameter at least equal to the diameter of a tortilla, each of the pans having a flat, circular base portion defined by an interior and an exterior flat surface, the base portion being surrounded by an integral curved rim portion extending to one side of the base portion and terminating in an annular symmetrical lip, the base and the rim portions, together, defining a heating space therebetween, the pans being positionable with lips in mutual contact in a closed orientation to define an enclosed space for restricting the loss of moisture during heating of one or more tortillas in the enclosd space;

a hinge means having a first hinge arm attached to the top one of the pans and a second hinge arm attached to the bottom one of the pans so that the top one of the pans is rotatable from the closed orientation into a fully open orientation about a hinge pin supporting the first and second hinge arms;

the apparatus further including a first and second handle means positioned on a common diameter of the pans at opposing positions and extending radially therefrom, the second handle means having a rotatable grip portion for rotatably supporting the pans for inverting same.

2. The apparatus of claim 1 wherein the first handle means includes a first and a second handle portions, each one of the portions being attached to one of the pans in mutually adjacent positions, so that with the pans in the closed orientation, the handle portions form an integral handle structure for gripping with a hand to carry and manipulate the apparatus.

3. The apparatus of claim 1 wherein with the bottom one of the pans supported on a flat surface, the rotatable grip portion is in contact with the flat surface for providing lateral stability to the apparatus.

4. The apparatus of claim 3 wherein the hinge means allows the top one of the pans to rotate more than 90 angular degrees from the closed orientation to the fully open orientation so as to remain in the fully open orientation when placed therein.

5. The apparatus of claim 4 wherein the rotatable grip portion includes a peripheral surface positioned for contacting the top hinge arm so as to hold the top pan in the fully open orientation.

6. The apparatus of claim 1 wherein the top one of the pans includes a plurality of bosses positioned and extending from the rim into the heating space for contacting the tortillas for holding same in a fixed position within the apparatus during warming and during inverting of the pans.

7. The apparatus of claim 6 wherein the bosses extend from the top one of the pans to within 1/16 of an inch of the bottom one of the pans.

8. The apparatus of claim 1 wherein the heating spaces of the pans will jointly accommodate at least 12 tortillas when the tortillas are arranged in a spiral overlapping order within the pans.

9. The apparatus of claim 1 wherein the heating spaces will accommodate a stack of at least six tortillas.

10. The apparatus of claim 5 wherein with the top one of the pans in the fully open orientation, the center of gravity of the top one of the pans is positioned with respect to the hinge pin so that the top one of the pans, when left untended, tends to remain in the fully open position.

11. The apparatus of claim 2 wherein with the bottom one of the pans supported on a flat surface, the first handle means is shaped so as to be in contact with the flat surface for providing lateral stability to the apparatus.

* * * * *